US009004721B2

(12) United States Patent
Zhang

(10) Patent No.: US 9,004,721 B2
(45) Date of Patent: Apr. 14, 2015

(54) LIGHT SOURCE HEAT DISSIPATION STRUCTURE AND BACKLIGHT MODULE

(75) Inventor: Pangling Zhang, Shenzhen (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 222 days.

(21) Appl. No.: 13/219,999

(22) Filed: Aug. 29, 2011

(65) Prior Publication Data

US 2012/0120631 A1    May 17, 2012

(30) Foreign Application Priority Data

Nov. 16, 2010  (CN) .......................... 2010 1 0548828

(51) Int. Cl.
| | | |
|---|---|---|
| F21V 29/00 | (2006.01) | |
| F21S 4/00 | (2006.01) | |
| F21Y 101/02 | (2006.01) | |
| F21Y 103/00 | (2006.01) | |

(52) U.S. Cl.
CPC ............... F21S 4/003 (2013.01); F21S 4/008 (2013.01); F21V 29/004 (2013.01); F21V 29/2293 (2013.01); F21V 29/246 (2013.01); F21V 29/262 (2013.01); F21Y 2101/02 (2013.01); F21Y 2103/003 (2013.01)

(58) Field of Classification Search
CPC .................................................... F21S 48/1104
USPC ................ 362/294, 373, 382, 97.1, 218, 225, 362/217.11, 217.14, 217.15
See application file for complete search history.

(56) References Cited

U.S. PATENT DOCUMENTS

| | | | |
|---|---|---|---|
| 6,998,650 B1* | 2/2006 | Wu ................................ 257/100 |
| 7,394,658 B2* | 7/2008 | McPhee ........................ 361/710 |
| 7,405,944 B2 | 7/2008 | Mayer et al. | |
| 7,488,097 B2* | 2/2009 | Reisenauer et al. .......... 362/373 |
| 7,674,010 B2* | 3/2010 | Griffiths et al. ........... 362/249.02 |
| 8,092,038 B2* | 1/2012 | Liao et al. .................... 362/217.1 |
| 8,109,647 B2* | 2/2012 | Soo et al. ................. 362/217.03 |
| 8,220,953 B1* | 7/2012 | Moore ...................... 362/217.01 |
| 2006/0146531 A1 | 7/2006 | Reo et al. | |
| 2008/0278954 A1* | 11/2008 | Speier ........................... 362/373 |
| 2009/0097249 A1* | 4/2009 | Lee et al. ................. 362/249.02 |

FOREIGN PATENT DOCUMENTS

| | | |
|---|---|---|
| CN | 101140381 A | 3/2008 |
| CN | 201100544 Y | 8/2008 |
| CN | 101413652 A | 4/2009 |
| CN | 101676609 A | 3/2010 |
| CN | 201571290 U | 9/2010 |

* cited by examiner

Primary Examiner — Thomas M Sember
Assistant Examiner — Tsion Tumebo
(74) Attorney, Agent, or Firm — Cheng-Ju Chiang

(57) ABSTRACT

Disclosed are a light source heat dissipation structure and a backlight module. The light source heat dissipation structure comprises at least one light bar having two lateral faces; and a heat dissipation base, comprising: a frame having an inner space, at last one open and a upper surface, and the open is formed on the frame and connected to the inner space, and the open comprises at least one open edge; and at least one elastic abutting wall having an attached surface; wherein the elastic abutting wall is fixed on the open edge, and the light bar is embedded in the open, and the attached surface is attached to the lateral face of the light bar to enlarge the contact area between the light bar and the heat dissipation base. The heat dissipation efficiency and the usage lifetime of the LED packaged structure can be improved accordingly.

17 Claims, 4 Drawing Sheets

LIGHT SOURCE HEAT DISSIPATION STRUCTURE AND BACKLIGHT MODULE

BACKGROUND OF THE INVENTION

1. Field of the Invention

The present invention generally relates to a light source heat dissipation structure, and more particularly to a light source heat dissipation structure capable of increasing easy assembling advantages and heat dissipation efficiency of the heat dissipation base and the light bar.

2. Description of Prior Art

The LCD (liquid crystal display) is a kind of FPD (flat panel display) which utilizes the property of liquid crystal material for showing images. Comparing with other display, the LCD has advantages of lightening, low driving voltage and low power consumption. The LCD has already become a major product in the market. However, the liquid crystal material in the LCD can not spontaneously generate light and needs the external light source. Therefore, a backlight module must exist in the LCD to provide the needed light source.

In general, the backlight modules can be categorized into two forms of a side lighting type and a direct light type. The backlight modules in prior arts mainly utilize the CCFL lamps, the HCFL lamps and semiconductor light emitting assembly as being light sources. The semiconductor light emitting assembly mainly is referred to use LEDs for lighting. Comparing with the CCFL, it saves more power, more energy, and it also has longer usage lifetime and smaller size. Therefore, there is an existing trend to replace the CCFL little by little as mentioning about the LEDs to be the major light sources in the future backlight module of the LCD.

Nowadays, the LEDs are mostly in a form of a chip set up on a heat sink and then provided with semiconductor packages as being LED packaged structures. Then, the LED packaged structures are fixed on a rod like circuit board and a rod like aluminum extruded section to construct a LB (light bar). Finally, the backside of the LB is attached to the aluminum heat sink plate of the backlight module to complete a light source heat dissipation structure. However, the drawback of the aforesaid light source heat dissipation structure is: the working temperature of the LED chip in the LED packaged structure raises with high level during the operation but the LED packaged structure only can transfer the heat via the heat sink, the circuit board and the aluminum extruded section to the aluminum heat sink plate indirectly. Because the PCB (print circuit board) positioned between the LED packaged structure and the aluminum extruded section is manufacture by materials with high thermo resistance, it cannot provide any assistance for the LED packaged structure to transfer the heat to the aluminum extruded section in time. Consequently, the temperature around the LED packaged structure obviously gets high to cause the uneven temperature distribution for respective display areas in the LCD and a reddish phenomenon. Accordingly, the image quality of the LCD is affected.

Moreover, the LED itself can be easily affected by the temperature rising in the working operation, and then the luminous efficiency and the working stability thereof also can be affected. In worse scenario, the usage lifetime of the LED can be shortened cause of being in high temperature condition with long time. Besides, in case that the light bar is simply adhered on the aluminum heat sink plate with adhesive or merely locked on the aluminum heat sink plate with screws. On some level, the heat dissipation efficiency will be affected because the heat insulated adhesive existing between the aluminum extruded section of the light bar and the aluminum heat sink plate causes neither non thermal contact nor non closed attachment between the two surfaces thereof. Moreover, the thickness of the entire structure has to be increased and advantageous for the design trend of smartening and lightening thereby. Besides, in high temperature condition with long time, the adhesive can be degraded and the adhesion can be gone to result in that the light bar detached from the aluminum heat sink plate. In case that the heat of the LED packaged structure cannot be transferred by the aluminum heat sink plate in time, A potential risk exists for the LED packaged structure to get overheated and burned.

Consequently, there is a need to provide a light source heat dissipation structure for the LEDs of the backlight module for solving the existing heat dissipation issues of prior art.

SUMMARY OF THE INVENTION

An objective of the present invention is to provide a light source heat dissipation structure and a back light module, id est to provide a light source heat dissipation structure to solve the existing heat dissipation issues of prior art.

For realizing the aforesaid objective, the present invention provides a light source heat dissipation structure, comprising:
at least one light bar, having two lateral faces; and
a heat dissipation base, comprising: a frame, having an inner space, at last one open and a upper surface, and the open is formed on the frame and connected to the inner space, and the open comprises at least one open edge; and at least one elastic abutting wall having an attached surface;
wherein the elastic abutting walls are fixed on the open edges, and the light bar is embedded in the open, and the attached surfaces of the elastic abutting walls are attached to the lateral faces of the light bar.

Furthermore, the present invention provides another light source heat dissipation structure, and the light source heat dissipation structure comprises:
at least one light bar, having two lateral faces; and
a heat dissipation base, comprising: a frame, having an inner space, at last one open and a upper surface, and the open is formed on the frame and connected to the inner space, and the open comprises at least one open edge; and at least one elastic abutting wall having an attached surface;
wherein the elastic abutting wall is fixed on the open edges, and the light bar is embedded in the open and the attached surfaces of the elastic abutting walls are attached to the lateral faces of the light bar.

In the light source heat dissipation structure of the another embodiment, the light bar further comprises:
at least one LED packaged structure; and
a carrier, having two lateral faces and a lower surface, and the carrier is electrically connected to the LED packaged structure;
the attached surface of the elastic abutting walls are attached to the lateral faces of carrier, and the lower surface of the carrier contacts the bottom of the inner space.

In one embodiment of the present invention, the heat dissipation base comprises the two elastic abutting walls, and the open comprises two open edges parallel with each other, wherein fixed ends of the elastic abutting walls are fixed on the open edges of the open.

In one embodiment of the present invention, the fixed ends of the elastic abutting walls are fixed on the open edges of the open by welding, gluing, riveting, screws.

In one embodiment of the present invention, attached surfaces of the elastic abutting walls and the lateral faces of the carrier are fixedly locked with at least one screw.

In one embodiment of the present invention, a second surface of the heat dissipation base further comprises at least one heat dissipation fin.

In one embodiment of the present invention, the light bar divides the inner space of the frame into two heat dissipation airflow channels.

In one embodiment of the present invention, the elastic abutting walls and the heat dissipation base are one-body formed.

In one embodiment of the present invention, the heat dissipation base is an aluminum extruded section.

In one embodiment of the present invention, the light bar further comprises: at least one LED packaged structure; and a carrier, having two lateral faces and a lower surface, and the carrier is electrically connected to the LED packaged structure; the attached surface of the elastic abutting walls are attached to the lateral faces of carrier, and the lower surface of the carrier contacts the bottom of the inner space.

In comparison with prior arts, the heat dissipation base of the light source heat dissipation structure can be directly combined with the light bar to form directly thermal contact between the lateral faces and the attached surfaces of the elastic abutting walls and to enlarge the contact area between the light bar and the heat dissipation base. Accordingly, the heat dissipation efficiency and the usage lifetime of the LED packaged structure can be improved; meanwhile, the number of screws for fixing the light bar and the heat dissipation base can be reduced or even be zero by utilizing the elastic abutting wall to embed the light bar in the inner space of the heat dissipation base to increase the easy assembling advantages.

DETAILED DESCRIPTION OF THE INVENTION

The following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

Figure 1A:
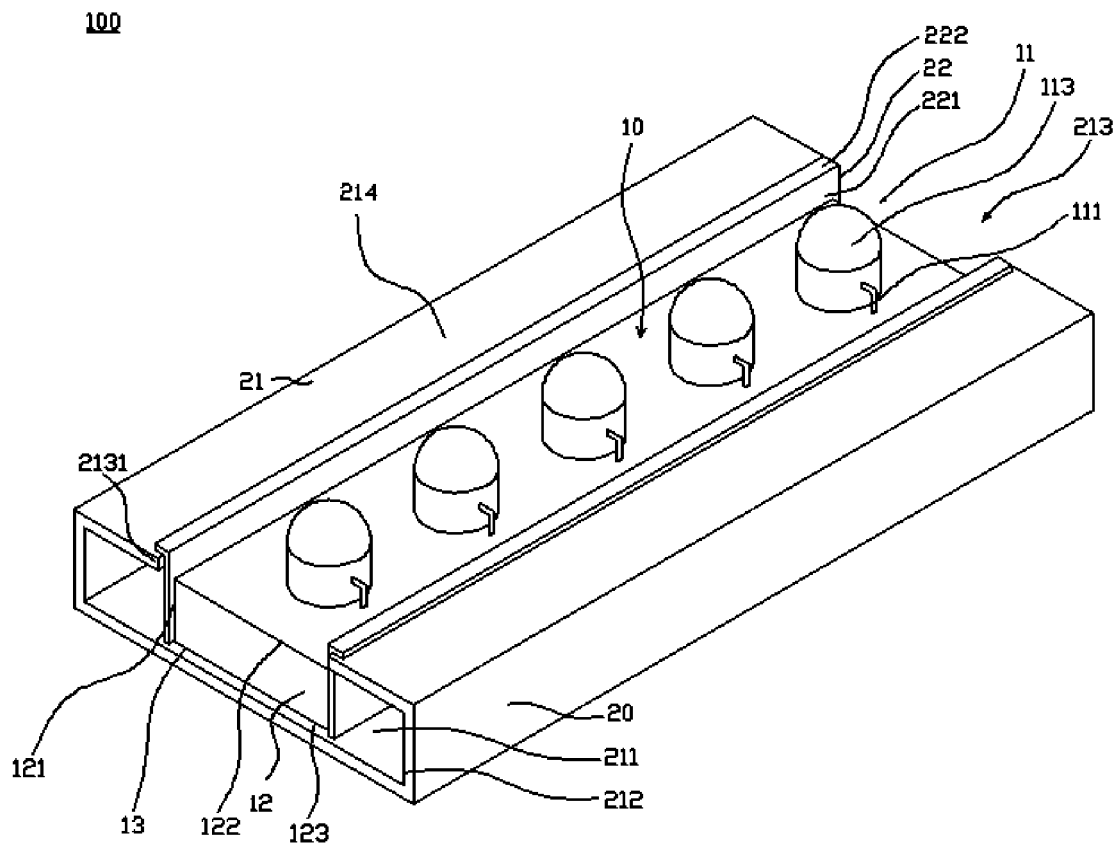
FIG. 1A shows diagram of a light source heat dissipation structure according to a first embodiment of the present invention.

Please refer to FIG. 1A, which shows diagram of a light source heat dissipation structure 100 according to a first embodiment of the present invention. The light source heat dissipation structure 100 according to the first embodiment of the present invention is utilized for illumination or for a LCD, and more particularly for a backlight module of the LCD. The light source heat dissipation structure 100 comprises at least one light bar 10 and a heat dissipation base 20. The detail description for the foregoing elements is introduced below in the present invention.

Figure 1B:
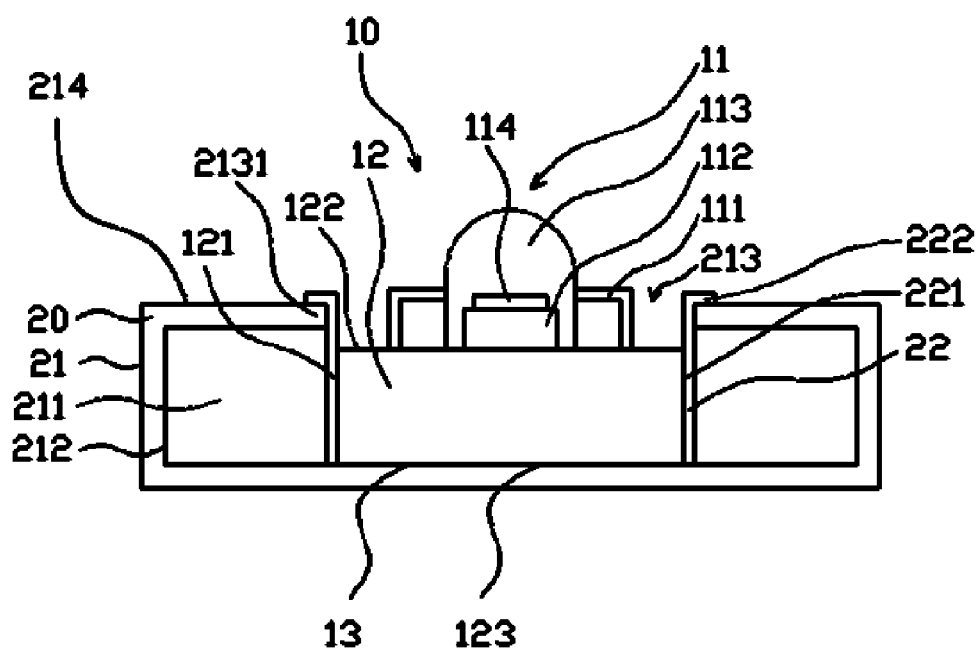
FIG. 1B shows a lateral sectional diagram of the light source heat dissipation structure according to the first embodiment of the present invention.

Please refer to FIG. 1B, which shows a lateral sectional diagram of the light source heat dissipation structure 100 according to the first embodiment of the present invention shown in FIG. 1A. The light source heat dissipation structure 100 is a light source heat dissipation structure of a side light type backlight module and the light bar 10 is a LED light bar. The light bar 10 can be assembled in at least one side of the optical film of the backlight module for being a light source of side light type backlight module but not limited thereto. For instance, the light bar 10 can be assembled under the optical film of the backlight module for being a light source of a direct light type backlight module. Moreover, the light bar 10 comprises at least one LED packaged structure 11, a carrier 12 and a bottom 13. The LED packaged structure 11 comprises at least two lead foots 111, a heat sink 112, a package colloid 113 and at least one LED chip 114; the carrier 12 has two lateral faces 121, an upper surface 122 and a lower surface 123. The lateral faces 121 of the carrier 12 are just the lateral faces 121 of the light bar 10. The lower surface 123 of the carrier 12 is just the bottom 13 of the light bar 10. The upper surface 122 of the carrier 12 is electrically connected to the lead foots 111 of the LED packaged structure 11. The LED packaged structure 11 is a finished LED package unit and comprises the package colloid 113, the LED chip 114, the heat sink 112 and a leadframe or a circuit board top down. The leadframe or the circuit board is also equipped with the lead foots 111. The lead foots 111 stretch out from the LED packaged structure 11 to be electrically connected with the circuit (not shown) on the upper surface 122 of the carrier 12. The LED packaged structure 11 is allowed to be imported an external power source thereto via the carrier 12 to generate light of specific color.

Figure 1C:
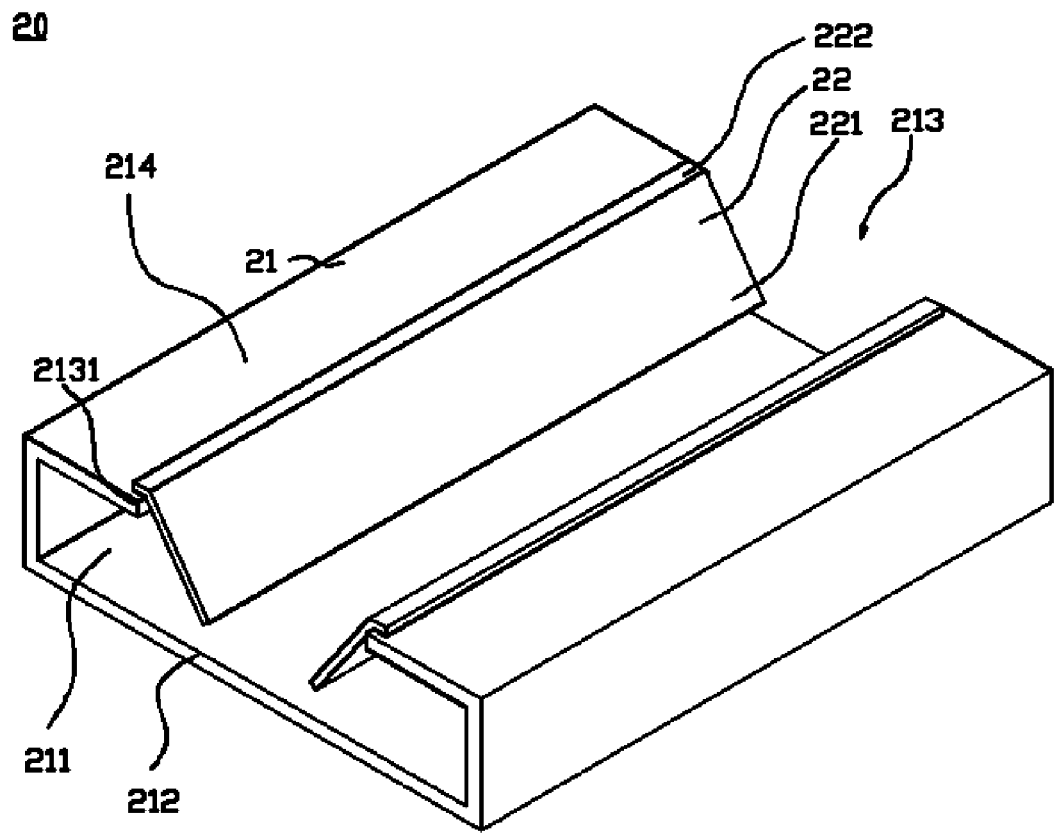
FIG. 1C shows diagram of a heat dissipation base of the light source heat dissipation structure according to the first embodiment of the present invention.

Please refer to FIG. 1C, which shows diagram of a heat dissipation base 20 of the light source heat dissipation structure 100 according to the first embodiment of the present invention shown in FIG. 1A. The heat dissipation base 20 of the light source heat dissipation structure 100 is substantially hollow, long and thin rectangular column shaped and comprises a frame 21 and at least one elastic abutting wall 22. The frame 21 has an inner space 211, at last one open 213 and an upper surface 214. The open 213 is formed on the upper surface 214 of the frame 21. Each open 213 has at least one open edge 2131. The open 213 penetrates the frame 21 and connect to the inner space 211. The elastic abutting wall 22 has an attached surface 221 and a fixed end 222. In this embodiment, the open 213 comprises two open edges 2131 parallel with each other. The fixed ends 222 of the elastic abutting walls 22 are fixed on the foregoing open edges 2131 parallel with each other. The elastic abutting walls 22 and the frame 21 can be one-body formed. Alternatively, a metal heat sink elastic abutting walls or an alloy heat sink elastic abutting walls can be fixed on the open edges 2131 of the open 213 by welding, gluing, riveting or screws but not limited thereto.

Please refer to FIG. 1B and FIG. 1C. The length of the attached surface 221 of the elastic abutting wall 22 is predeterminedly longer than the height of the frame 21. The attached surfaces 221 of the elastic abutting walls 22 are also designed to be oblique toward the center of the inner space 211 of the frame 21. Moreover, the width of the light bar 10 fits the width of the open 213 of the frame 21 for embedding the light bar 10 in the open 213. As shown in FIG. 1C, the width of the light bar 10 is larger than the distance between two bottoms of the attached surfaces 221 of the elastic abutting walls 22 before the light bar 10 is assembled to the heat dissipation base 20. Because the elastic abutting walls 22 are made by elastic and tough material, the elastic abutting walls 22 applies holding force to the lateral faces 121 of the LED packaged structure 11 after the LED packaged structure 11 is assembled and embedded into the open 213 of the heat dissipation base 20. The elastic abutting walls 22 can stably embed and fix the LED packaged structure 11 in the inner space 211 of the frame 21.

Please refer to FIG. 1B and FIG. 1C still. The heat sink 112 of the LED packaged structure 11 is exposed from the bottom of the LED packaged structure 11 and fixed on the upper surface 122 of the carrier 12. Therefore, the heat sink 112 contacts the carrier 12 directly; the lower surface 123 of the carrier 12 fixedly reaches the bottom 212 of the inner space 211 in the frame 21 of the heat dissipation base 20. Accordingly, the lower surface 123 of heat dissipation base 20 also has direct thermal contact with the bottom 212 of the inner space 211. The LED packaged structure 11 can transfer the heat to the heat dissipation base 20 via the carrier 12 with the heat sink 112; moreover, as the LED packaged structure 11 is embedded in the open 213 of the heat dissipation base 20, the attached surfaces 221 of the elastic abutting walls 22 are attached with the lateral faces 121 of the carrier 12 accordingly. That is, the lateral faces 121 have thermal contact with the elastic abutting walls 22 respectively to increase the contact area between the light bar and the heat dissipation base. The thermal conductivity of the LED packaged structure 11 is raised.

Please refer to FIG. 1B still, the elastic abutting walls 22 are fixed on the open edges 2131 of the open 213. The light bar 10 is embedded in the open 213. The attached surfaces 221 of the elastic abutting walls 22 are attached to the lateral faces 121 of the carrier 12 of the light bar 10. Meanwhile, the lower surface 123 of the carrier 12 reaches the bottom 212 of the inner space 211 of the frame 21. Therefore, the carrier 12 divides the inner space 211 of the frame 21 into two heat dissipation airflow channels. The heat dissipation base 20 and the elastic abutting walls 22 are made by heat conductive material with good heat dissipation efficiency, such as kinds of metal or alloy, and particularly mentioning about utilizing a metal heat sink plate, an aluminum extruded section or an alloy heat sink plate made by aluminum, aluminum alloy or aluminum-contained material. With the assistance of the good thermal conductivity and the good heat dissipation property of the heat dissipation base 20, these materials are beneficial to the direct thermal contact of the LED packaged structure 11 with the heat dissipation base 20 via the heat sink 112 and the carrier 12, or beneficial to the thermal contact with the elastic abutting walls 22 to transfer and dissipate the heat. Therefore, the heat dissipation efficiency of light source heat dissipation structure 100 can be raised to achieve the target of rapid cooling. For ensuring the contact goodness of fit between the elastic abutting walls 22 and the light bar 10, the attached surfaces 221 of the elastic abutting walls 22 and the lateral faces 121 of the light bar 10 can be fixedly locked with at least one screw (not shown) or by agglutination. Between the heat sink 112 exposed from bottom of the LED packaged structure 11 and the upper surface 122 of the carrier 12, between the lower surface 123 of the carrier 12 and the inner space of the heat dissipation base 12, or between the lateral faces 121 of the light bar 10 and the attached surfaces 221 of the elastic abutting walls 22, these direct contact portions can be coated with thermally conductive adhesive (not shown) of proper quantities in advance. Thus, better heat dissipation efficiencies are gained among the heat sink 112, the carrier 12, the elastic abutting walls 22 and the dissipation base 20. The carrier 12 can be a PCB, an anodic aluminum oxide substrate or other substrates with electric patterns thereon.

Figure 2:
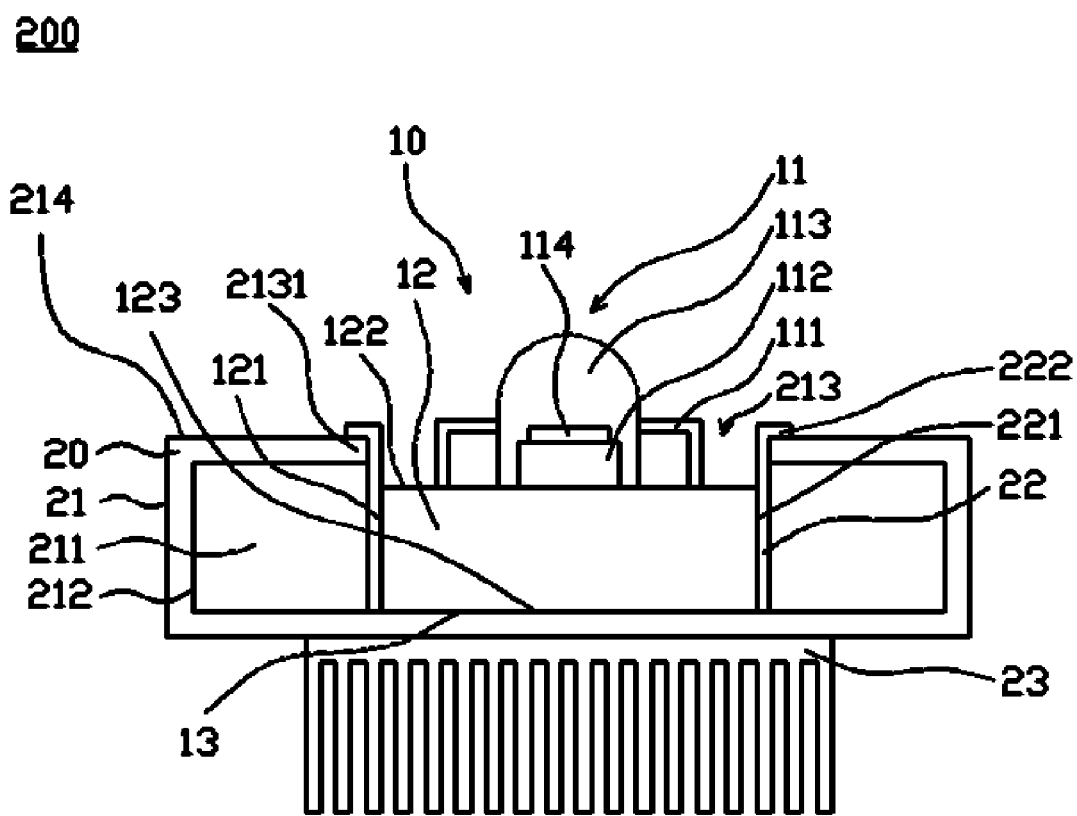
FIG. 2 shows a lateral sectional diagram of the light source heat dissipation structure according to a second embodiment of the present invention.

Please refer to FIG. 2. The second embodiment of the present invention is similar with the light source heat dissipation structure 100 of the first embodiment of the present invention. Therefore, the same indicators and names are followed. The different feature is: the heat dissipation base 20 is improved in advance in the light source heat dissipation structure 200 of the second embodiment and the related detail description of the present invention is introduced below.

Please refer to FIG. 2, which shows a lateral sectional diagram of the light source heat dissipation structure 200 according to a second embodiment of the present invention. In the second embodiment of the present invention, the light source heat dissipation structure 200 comprises at least one light bar 10 and a heat dissipation base 20. The different feature is: light source heat dissipation structure 200 further comprises at least one heat dissipation fin 23. The heat dissipation fins 23 are located on the frame 21 of the heat dissipation base 20. Therefore, the heat sink 112 of the LED packaged structure 11 can transfer and dissipate the heat directly via the thermal contact among the carrier 12 and the heat dissipation base 12, elastic abutting walls 22 with the assistance of the good thermal conductivity and the good heat dissipation property of the heat dissipation base 12 and the elastic abutting walls 22. Meanwhile, the heat dissipation fins 23 can be utilized for increasing the heat dissipation area of the heat dissipation base 12 and improving the heat dissipation efficiency of the LED packaged structure 11. The heat dissipation fins 23 and the heat dissipation base 12 can be one-body formed or fixed on the frame 21 of the heat dissipation base 12 by welding, gluing, riveting or screws but not limited thereto.

Please refer to FIG. 1C and FIG. 2. The benefits of the first and the second embodiments of the present invention are: the light source heat dissipation structures 100, 200 can realize good thermal conductivity and good heat dissipation efficiency with the assistances of the assemblies of the LED packaged structure 11, the carrier 12, the heat dissipation base 20 and the elastic abutting walls 22 and further with the arrangement of the heat dissipation fins 23 properly. The LED packaged structure 11 can transfer the heat to the elastic abutting walls 22 of the heat dissipation base 20 and the bottom 212 of the inner space 211 via the carrier 12. Moreover, the heat dissipation base 20 is a hollow rectangular column. The elastic abutting walls 22 are located on the open edges 2131 of the open 213 respectively. When the light bar 10 is embedded in the open 213, the attached surfaces 221 of the elastic abutting walls 22 are attached to the lateral faces 121 of the light bar 10. A cavity is formed between the inner space 211 of the heat dissipation base 20 and the elastic abutting wall 22. The lower surface 123 of the carrier 12 reaches the bottom 212 of the inner space 211 of the frame 21. Therefore, the carrier 12 divides the inner space 211 of the frame 21 into two heat dissipation airflow channels. After the heat of the LED packaged structure 11 is transferred to the elastic abutting walls 22, the cavity can allow that the elastic abutting walls 22 exchange the heat with the air directly. Besides, the heat dissipation fins 23 can be utilized for increasing the heat dissipation area of the heat dissipation base 12 and improving the heat dissipation efficiency of the LED packaged structure 11. It is beneficial to the heat sink 112 of the LED packaged structure 11 and the carrier 12 for transferring and dissipating the heat with the assistance of the good thermal conductivity and the good heat dissipation property of the heat dissipation base 20. Accordingly, the heat dissipation efficiency and the usage lifetime of the LED packaged structure 11 can be improved. Furthermore, with the assembly of embedding the LED packaged structure 11 in the open 213 of the heat dissipation base 20, not only the structure and the assembly process can be simplified but the work hours also can be shortened to reduce the possibility of poor assembly and save the assembly cost. Therefore, the present invention has benefits of reducing the productive time and total cost of the light source heat dissipation structure 100, 200. The yield rate of assembly can be raised to achieve the cost down target of the productions.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A light source heat dissipation structure, comprising:
    at least one light bar, having two lateral faces and a lower surface, wherein the lateral faces are perpendicular to the lower surface, and the lateral faces of the light bar are two elongated faces; and
    a heat dissipation base, comprising:
        a frame, having an inner space, at last one open and an upper surface, and the open is formed on the frame and connected to the inner space, and the open comprises at least one open edge; and
        two elastic abutting walls having attached surfaces, wherein the attached surfaces of the two elastic abutting walls are two elongated surfaces, and an area of the attached surfaces is larger than an area of the lateral faces of the light bar;
    wherein the elastic abutting walls are fixed on the open edges, and the light bar is embedded in the open, and the two elongated faces of the light bar are in contact with the two elongated surfaces of the two elastic abutting walls;
    wherein the heat dissipation base is an aluminum extruded section and the light bar divides the inner space of the frame into two heat dissipation airflow channels; and
    wherein a width of the light bar is larger than a distance between two bottoms of the attached surfaces of the elastic abutting walls before the light bar is assembled to the heat dissipation base, and the width of the light bar is identical to the distance between the two bottoms of the attached surfaces after the light bar is assembled to the heat dissipation base.

2. A backlight module having a light source heat dissipation structure, wherein the backlight module having the light source heat dissipation structure comprises:
    at least one light bar, having two lateral faces and a lower surface, wherein the lateral faces are perpendicular to the lower surface, and the lateral faces of the light bar are two elongated faces; and
    a heat dissipation base, comprising:
        a frame, having an inner space, at last one open and an upper surface, and the open is formed on the frame and connected to the inner space, and the open comprises at least one open edge; and
        two elastic abutting walls having attached surfaces, wherein the attached surfaces of the two elastic abutting walls are two elongated surfaces, and an area of the attached surfaces is larger than an area of the lateral faces of the light bar;
    wherein the elastic abutting walls are fixed on the open edges, and the light bar is embedded in the open, and the two elongated faces of the light bar are in contact with the two elongated surfaces of the two elastic abutting walls;
    wherein a width of the light bar is larger than a distance between two bottoms of the attached surfaces of the elastic abutting walls before the light bar is assembled to the heat dissipation base, and the width of the light bar is identical to the distance between the two bottoms of the attached surfaces after the light bar is assembled to the heat dissipation base.

3. The backlight module of claim 2, wherein the light bar comprises:
    at least one light emitting diode (LED) packaged structure; and
    a carrier, having two lateral faces and a lower surface, and the carrier is electrically connected to the LED packaged structure;
    wherein the attached surfaces of the elastic abutting walls are attached to the lateral faces of the carrier, and the lower surface of the carrier contacts the bottom of the inner space.

4. The backlight module of claim 2, wherein the heat dissipation base comprises the two elastic abutting walls and the open comprises two open edges parallel with each other, wherein fixed ends of the elastic abutting walls are fixed on the open edges of the open.

5. The backlight module of claim 4, wherein fixed ends of the elastic abutting walls are fixed on the open edges of the open by welding, gluing, riveting, screws.

6. The backlight module of claim 3, wherein the attached surfaces of the elastic abutting walls and the lateral faces of the carrier are fixedly locked with at least one screw.

7. The backlight module of claim 2, wherein a second surface of the heat dissipation base further comprises at least one heat dissipation fin.

8. The backlight module of claim 2, wherein the light bar divides the inner space of the frame into two heat dissipation airflow channels.

9. The backlight module of claim 2, wherein the heat dissipation base is an aluminum extruded section.

10. A light source heat dissipation structure, comprising:
    at least one light bar, having two lateral faces and a lower surface, wherein the lateral faces are perpendicular to the lower surface, and the lateral faces of the light bar are two elongated faces; and
    a heat dissipation base, comprising:
        a frame, having an inner space, at last one open and an upper surface, and the open is formed on the frame and connected to the inner space, and the open comprises at least one open edge; and
        two elastic abutting walls having an attached surfaces, wherein the attached surfaces of the two elastic abutting walls are two elongated surfaces, and an area of the attached surfaces is larger than an area of the lateral faces of the light bar;
    wherein the elastic abutting walls are fixed on the open edges, and the light bar is embedded in the open, and the two elongated faces of the light bar are in contact with the two elongated surfaces of the two elastic abutting walls;
    wherein a width of the light bar is larger than a distance between two bottoms of the attached surfaces of the elastic abutting walls before the light bar is assembled to the heat dissipation base, and the width of the light bar is identical to the distance between the two bottoms of the attached surfaces after the light bar is assembled to the heat dissipation base.

11. The light source heat dissipation structure of claim 10, wherein the light bar comprises:
  at least one light emitting diode (LED) packaged structure; and
  a carrier, having two lateral faces and a lower surface, and the carrier is electrically connected to the LED packaged structure;
  wherein the attached surfaces of the elastic abutting walls are attached to the lateral faces of the carrier, and the lower surface of the carrier contacts the bottom of the inner space.

12. The light source heat dissipation structure of claim 10, wherein the heat dissipation base comprises the two elastic abutting walls and the open comprises two open edges parallel with each other, wherein fixed ends of the elastic abutting walls are fixed on the open edges of the open.

13. The light source heat dissipation structure of claim 12, wherein the fixed ends of the elastic abutting walls are fixed on the open edges of the open by welding, gluing, riveting, screws or one-body formed on the open edges of the open.

14. The light source heat dissipation structure of claim 11, wherein the attached surfaces of the elastic abutting walls and the lateral faces of the carrier are fixedly locked with at least one screw.

15. The light source heat dissipation structure of claim 10, wherein a second surface of the heat dissipation base further comprises at least one heat dissipation fin.

16. The light source heat dissipation structure of claim 10, wherein the light bar divides the inner space of the frame into two heat dissipation airflow channels.

17. The light source heat dissipation structure of claim 10, wherein the heat dissipation base is an aluminum extruded section.

* * * * *